US009209907B2

(12) United States Patent
Guckenberger

(10) Patent No.: US 9,209,907 B2
(45) Date of Patent: *Dec. 8, 2015

(54) METHOD AND SYSTEM FOR A NARROWBAND, NON-LINEAR OPTOELECTRONIC RECEIVER

(71) Applicant: Luxtera, Inc., Carlsbad, CA (US)

(72) Inventor: John Andrew Guckenberger, San Diego, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/337,736

(22) Filed: Jul. 22, 2014

(65) Prior Publication Data

US 2014/0334832 A1 Nov. 13, 2014

Related U.S. Application Data

(63) Continuation of application No. 12/245,867, filed on Oct. 6, 2008, now Pat. No. 8,787,774.

(60) Provisional application No. 60/998,314, filed on Oct. 10, 2007.

(51) Int. Cl.
*H04B 10/06* (2006.01)
*H04B 10/60* (2013.01)
(Continued)

(52) U.S. Cl.
CPC ............ *H04B 10/60* (2013.01); *H04B 10/2575* (2013.01); *H04B 10/6972* (2013.01)

(58) Field of Classification Search
CPC ........ H04B 10/60; H04B 10/66; H04B 10/69; H04B 10/697; H04B 10/6972; H04B 10/2575
USPC .......................................... 398/159, 202, 212
See application file for complete search history.

(56) References Cited

U.S. PATENT DOCUMENTS 3,585,598 A * 6/1971 Hudson et al. ................ 455/112
3,980,825 A * 9/1976 Morrien ........................ 375/282
4,019,048 A * 4/1977 Maione et al. ................ 398/155
(Continued)

OTHER PUBLICATIONS

"2005 IEEE International SOI Conference, CMOS Photonics™—SOI Learns a New Trick Cary Gunn, PhD".*
(Continued)

*Primary Examiner* — Ken Vanderpuye
*Assistant Examiner* — Abbas H Alagheband
(74) *Attorney, Agent, or Firm* — McAndrews, Held & Malloy

(57) ABSTRACT

Methods and systems for a narrowband, non-linear optoelectronic receiver are disclosed and may include amplifying a received signal, limiting a bandwidth of the received signal, and restoring the signal utilizing a level restorer, which may include a non-return to zero (NRZ) level restorer comprising two parallel inverters, with one being a feedback path for the other. The inverters may be single-ended or differential. A photogenerated signal may be amplified in the receiver utilizing a transimpedance amplifier and programmable gain amplifiers (PGAs). A received electrical signal may be amplified via PGAs. The bandwidth of the received signal may be limited utilizing one or more of: a low pass filter, a bandpass filter, a high pass filter, a differentiator, or a series capacitance on the chip. The signal may be received from a photodiode integrated on the chip, where the photodiode may be AC coupled to an amplifier for the amplifying.

18 Claims, 10 Drawing Sheets

(51) Int. Cl.
*H04B 10/69* (2013.01)
*H04B 10/2575* (2013.01)

(56) References Cited

U.S. PATENT DOCUMENTS

| | | | | |
|---|---|---|---|---|
| 4,350,973 | A * | 9/1982 | Petryk, Jr. | 398/202 |
| 4,426,662 | A * | 1/1984 | Skerlos et al. | 348/734 |
| 4,479,266 | A * | 10/1984 | Eumurian et al. | 327/72 |
| 4,481,676 | A * | 11/1984 | Eumurian et al. | 398/136 |
| 4,644,145 | A * | 2/1987 | Gundner | 250/205 |
| 4,706,300 | A * | 11/1987 | Minemura et al. | 398/204 |
| 4,713,841 | A * | 12/1987 | Porter et al. | 398/191 |
| 4,736,391 | A * | 4/1988 | Siegel | 375/317 |
| 4,980,577 | A * | 12/1990 | Baxter | 327/198 |
| 5,319,438 | A * | 6/1994 | Kiasaleh | 398/203 |
| 5,337,388 | A * | 8/1994 | Jacobowitz et al. | 385/76 |
| 5,444,561 | A * | 8/1995 | Kaminishi | 398/155 |
| 6,642,765 | B2 * | 11/2003 | Markovic et al. | 327/211 |
| 7,215,891 | B1 * | 5/2007 | Chiang et al. | 398/137 |
| 7,259,031 | B1 * | 8/2007 | Dickinson et al. | 438/23 |
| 7,324,207 | B1 * | 1/2008 | Kirkpatrick et al. | 356/478 |
| 7,474,858 | B2 * | 1/2009 | Lee et al. | 398/183 |
| 8,110,823 | B2 * | 2/2012 | Bowers | 257/14 |
| 2001/0050333 | A1 * | 12/2001 | Feng et al. | 250/214 A |
| 2002/0027689 | A1 * | 3/2002 | Bartur et al. | 359/152 |
| 2002/0089728 | A1 * | 7/2002 | Kim | 359/189 |
| 2002/0186048 | A1 * | 12/2002 | Tang et al. | 326/86 |
| 2006/0002489 | A1 * | 1/2006 | Zuhdi et al. | 375/282 |
| 2007/0081578 | A1 * | 4/2007 | Fudge et al. | 375/130 |
| 2007/0086544 | A1 * | 4/2007 | Fudge et al. | 375/316 |
| 2009/0196632 | A1 * | 8/2009 | Zhang | 398/202 |
| 2010/0284700 | A1 * | 11/2010 | Gopinath | 398/141 |

OTHER PUBLICATIONS

Silicon Photonics Bahram Jalali, Fellow, IEEE, and Sasan Fathpour, Member, IEEE; Journal of Lightwave Technology, vol. 24, No. 12, Dec. 2006.*

A 2.5-mW SOS CMOS Optical Receiver for Chip-to-Chip Interconnect Alyssa Apsel, Member, IEEE, Zhongtao Fu, Member, IEEE, and Andreas G. Andreou, Member, IEEE Journal of Lightwave Technology, vol. 22, No. 9, Sep. 2004.*

Fast Offset Compensation for a 10Gbps Limit Amplifier by Ethan A. Crain Massachusetts Institute of Technology, Dec. 1995 Submitted to the Department of Electrical Engineering and Computer Science May 2004.*

* cited by examiner

METHOD AND SYSTEM FOR A NARROWBAND, NON-LINEAR OPTOELECTRONIC RECEIVER

CROSS-REFERENCE TO RELATED APPLICATIONS/INCORPORATION BY REFERENCE

This application is a continuation of application Ser. No. 12/245,867 filed on Oct. 6, 2008, which in turn makes reference to, claims priority to and claims the benefit of U.S. Provisional Patent Application No. 60/998,314 filed on Oct. 10, 2007.

The above stated application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to signal processing. More specifically, certain embodiments of the invention relate to a method and system for a narrowband, non-linear optoelectronic receiver.

BACKGROUND OF THE INVENTION

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a narrowband, non-linear optoelectronic receiver, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for a narrowband, non-linear optoelectronic receiver. Exemplary aspects of the invention may comprise amplifying a received signal, limiting a bandwidth of the received signal, and restoring the amplified, bandwidth-limited received signal utilizing a level restorer. The level restorer may comprise a non-return to zero (NRZ) level restorer. The NRZ level restorer may comprise a pulse-triggered bistable circuit. The pulse-triggered bistable circuit may comprise two parallel inverters, where a first of the inverters comprises a feedback path for a second of the inverters, and where the inverters may comprise single-ended or differential inverters. A photogenerated signal may be amplified in the receiver utilizing a transimpedance amplifier and one or more variable gain amplifiers (VGAs). A received electrical signal may be amplified via one or more VGAs. The bandwidth of the received signal may be limited utilizing one or more of a low pass filter, a bandpass filter, a high pass filter, a differentiator, and/or a series capacitance on the chip. The signal may be received from a photodiode integrated on the chip.

Figure 1A:
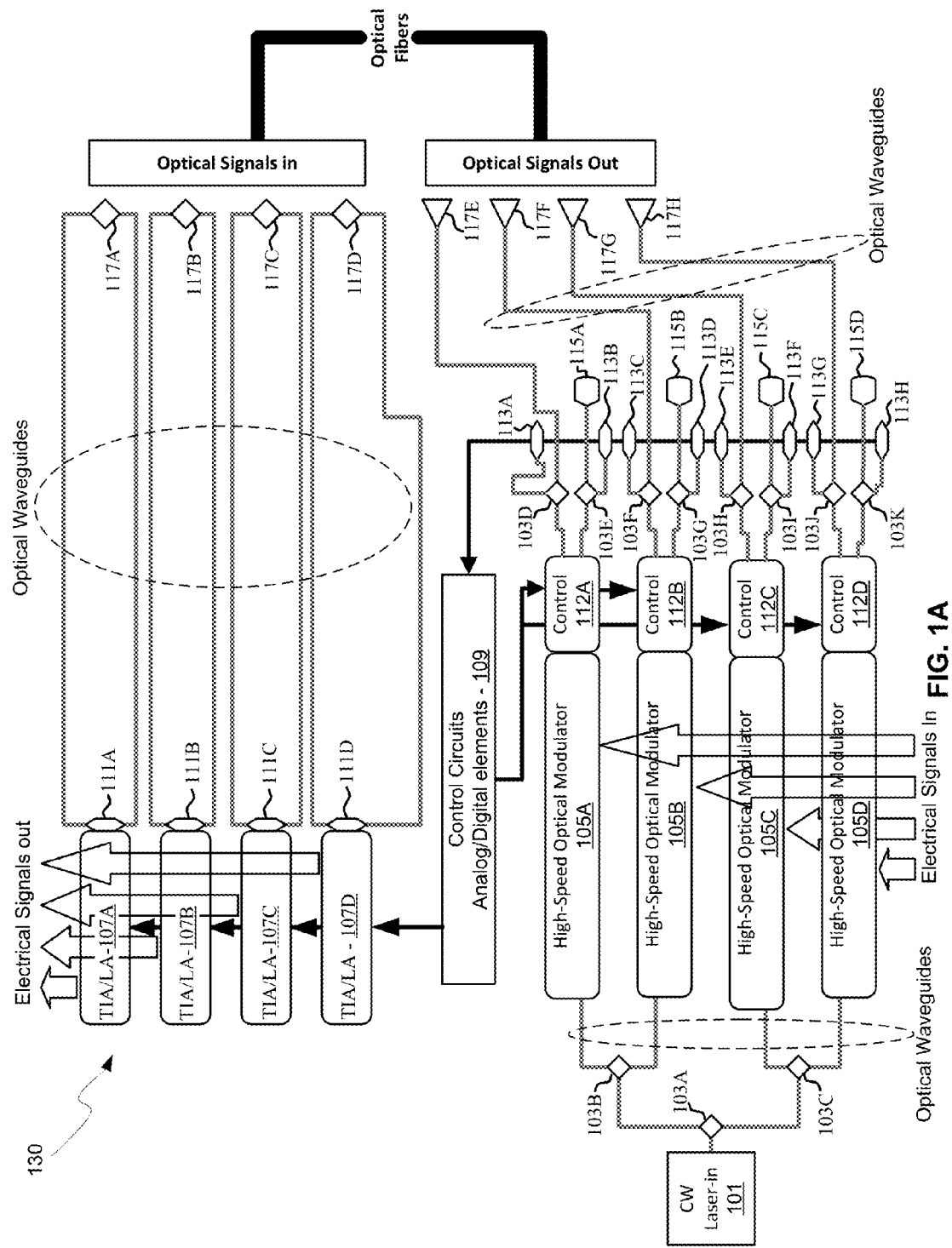
FIG. 1A is a block diagram of a photonically enabled CMOS chip, in accordance with an embodiment of the invention.

FIG. 1A is a block diagram of a photonically enabled CMOS chip, in accordance with an embodiment of the invention. Referring to FIG. 1A, there is shown optoelectronic devices on a CMOS chip 130 comprising high speed optical modulators 105A-105D, high-speed photodiodes 111A-111D, monitor photodiodes 113A-113H, and optical devices comprising taps 103A-103K, optical terminations 115A-115D, and grating couplers 117A-117H. There is also shown electrical devices and circuits comprising transimpedance and limiting amplifiers (TIA/LAs) 107A-107E, analog and digital control circuits 109, and control sections 112A-112D. Optical signals are communicated between optical and optoelectronic devices via optical waveguides fabricated in the CMOS chip 130.

The high speed optical modulators 105A-105D comprise Mach-Zehnder or ring modulators, for example, and enable the modulation of the CW laser input signal. The high speed optical modulators 105A-105D are controlled by the control sections 112A-112D, and the outputs of the modulators are optically coupled via waveguides to the grating couplers 117E-117H. The taps 103D-103K comprise four-port optical couplers, for example, and are utilized to sample the optical signals generated by the high speed optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the CMOS chip 130. The grating couplers 117A-117D are utilized to couple light received from optical fibers into the CMOS chip 130, and the grating couplers 117E-117H are utilized to couple light from the CMOS chip 130 into optical fibers. The optical fibers may be epoxied, for example, to the CMOS chip, and may be aligned at an angle from normal to the surface of the CMOS chip 130 to optimize coupling efficiency.

The high-speed photodiodes 111A-111D convert optical signals received from the grating couplers 117A-117D into electrical signals that are communicated to the TIA/LAs 107A-107D for processing. The analog and digital control circuits 109 may control gain levels or other parameters in the operation of the TIA/LAs 107A-107D. The TIA/LAs 107A-107D then communicate electrical signals to other circuitry on the CMOS chip 130 and/or circuitry/devices off-chip.

The TIA/Las 107A-107D may comprise narrowband, non-linear optoelectronic receiver circuitry. Accordingly, the narrowband receiver front-end may be followed by a non-return to zero (NRZ) level restorer circuit. This circuit limits the bandwidth of the optical receiver in order to decrease the integrated noise, thereby increasing the signal to noise ratio. An NRZ level restorer may be used to convert the resulting data pulses back into NRZ data.

Specifically, the narrowband receiver front-end provides amplification in a narrow band which includes the maximum data tone (i.e. 5 GHz for 10 Gb/s NRZ data). This limited bandwidth may be implemented in a variety of ways including, but not limited to, the integration of a series filter, such as a high pass, band pass or differentiating filters, for example. A non-linear NRZ level restorer may then be used to convert the resulting pulses back to their NRZ levels, creating an effectively 0 Hz low frequency cut-off. The NRZ level restorer may be implemented using a variety of techniques, including a bistable cross-coupled inverter pair, which may be pulse triggered to switch between its two states.

The control sections 112A-112D comprise electronic circuitry that enable modulation of the CW laser signal received from the taps 103A-103C. The high speed optical modulators 105A-105D require high-speed electrical signals to modulate the refractive index in respective branches of a Mach-Zehnder interferometer (MZI), for example. The voltage swing required for driving the MZI is a significant power drain in the CMOS chip 130. Thus, if the electrical signal for driving the modulator may be split into domains with each domain traversing a lower voltage swing, power efficiency is increased.

Figure 1B:
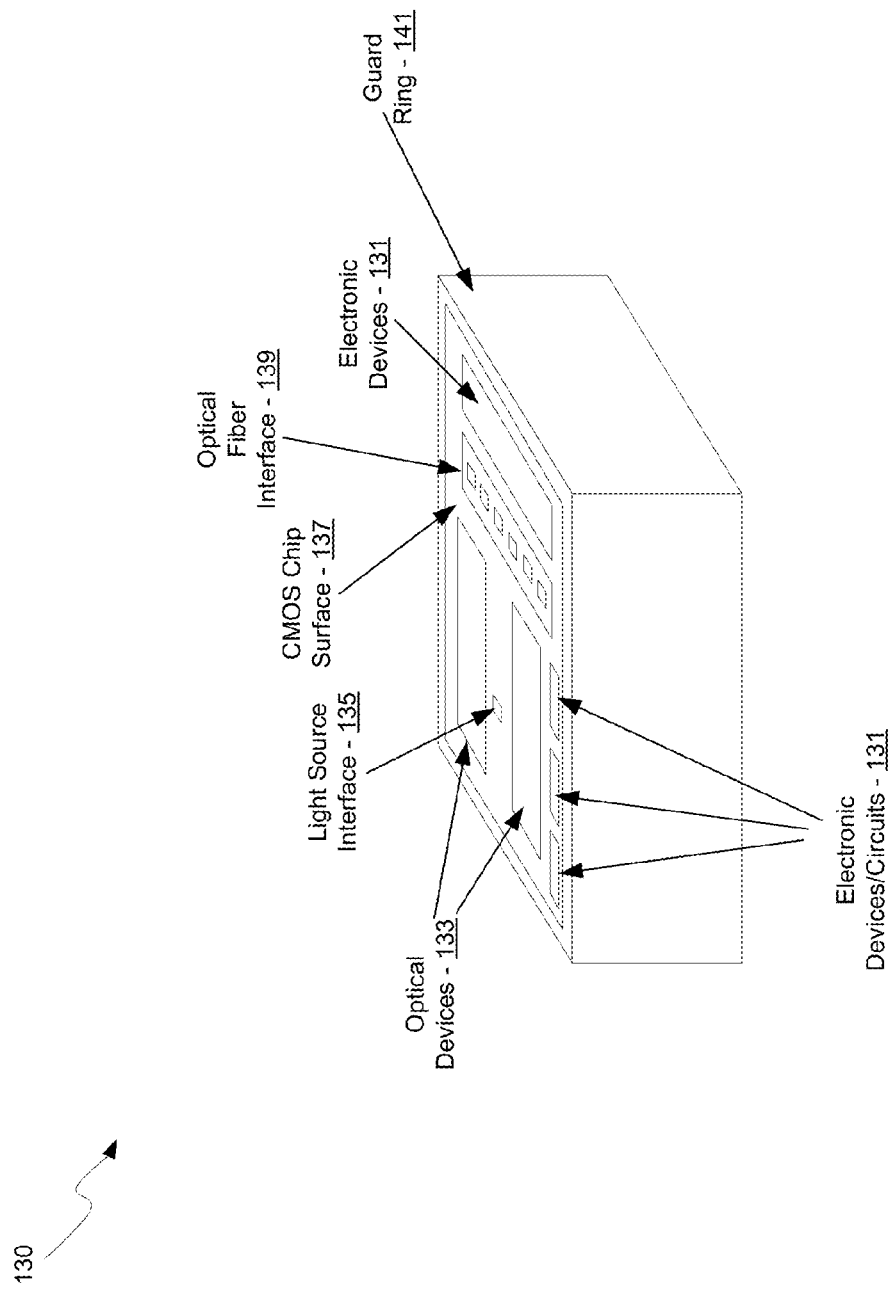
FIG. 1B is diagram illustrating an exemplary CMOS chip, in accordance with an embodiment of the invention.

FIG. 1B is a diagram illustrating an exemplary CMOS chip, in accordance with an embodiment of the invention. Referring to FIG. 1B, there is shown the CMOS chip 130 comprising electronic devices/circuits 131, optical and optoelectronic devices 133, a light source interface 135, CMOS chip surface 137, an optical fiber interface 139, and CMOS guard ring 141.

The light source interface 135 and the optical fiber interface 139 comprise grating couplers that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge.

The electronic devices/circuits 131 comprise circuitry such as the TIA/LAs 107A-107D and the analog and digital control circuits 109 described with respect to FIG. 1A, for example. The optical and optoelectronic devices 133 comprise devices such as the taps 103A-103K, optical terminations 115A-115D, grating couplers 117A-117H, high speed optical modulators 105A-105D, high-speed photodiodes 111A-111D, and monitor photodiodes 113A-113H.

Figure 1C:
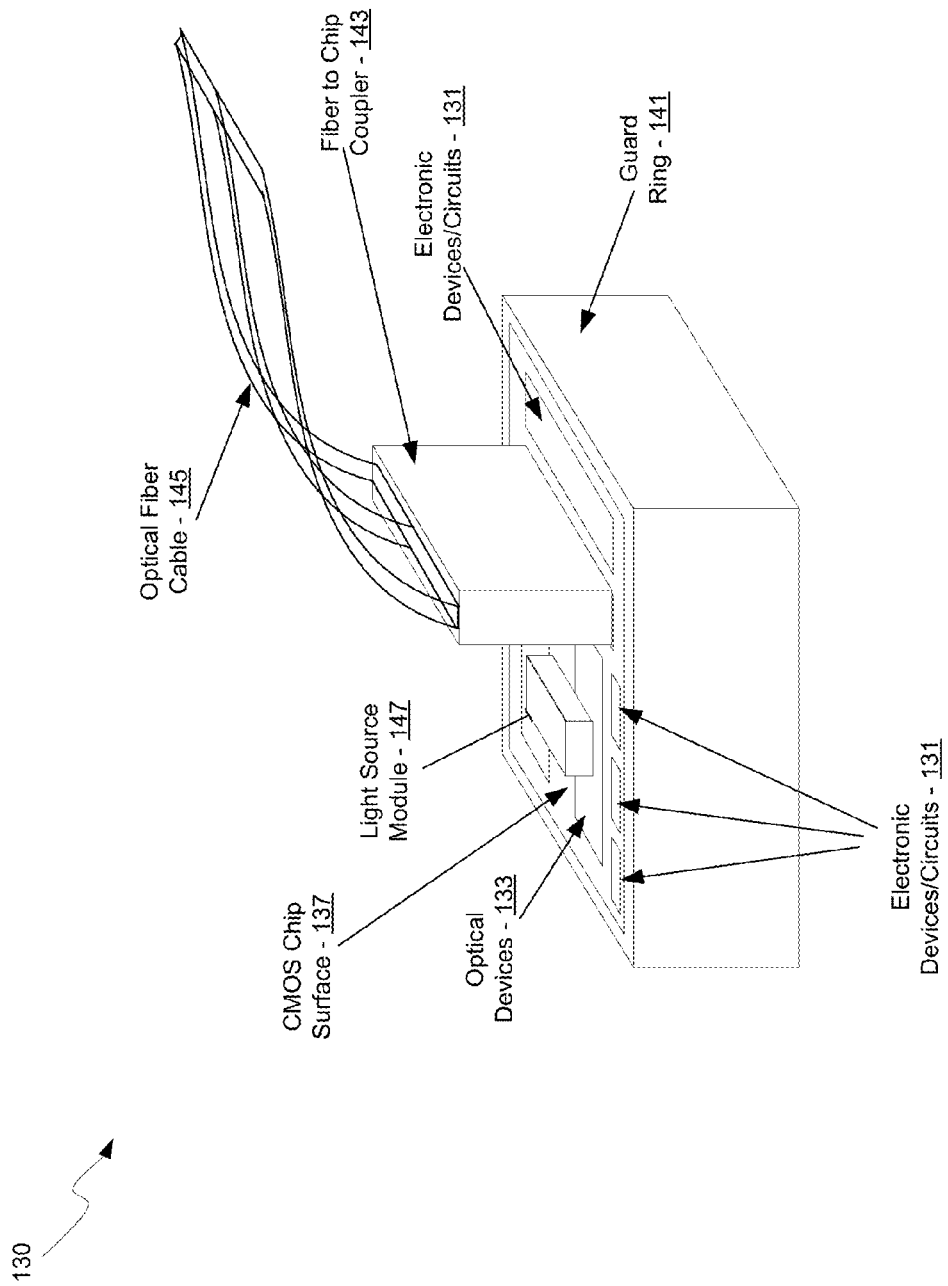
FIG. 1C is a diagram illustrating an exemplary CMOS chip coupled to an optical fiber cable, in accordance with an embodiment of the invention.

FIG. 1C is a diagram illustrating an exemplary CMOS chip coupled to an optical fiber cable, in accordance with an embodiment of the invention. Referring to FIG. 1C, there is shown the CMOS chip 130 comprising the electronic devices/circuits 131, the optical and optoelectronic devices 133, the light source interface 135, the CMOS chip surface 137, and the CMOS guard ring 141. There is also shown a fiber to chip coupler 143, an optical fiber cable 145, and a light source module 147.

The CMOS chip 130 comprising the electronic devices/circuits 131, the optical and optoelectronic devices 133, the light source interface 135, the CMOS chip surface 137, and the CMOS guard ring 141 may be as described with respect to FIG. 1B.

In an embodiment of the invention, the optical fiber cable may be affixed, via epoxy for example, to the CMOS chip surface 137. The fiber chip coupler 143 enables the physical coupling of the optical fiber cable 145 to the CMOS chip 130.

The light source module 147 may be affixed, via epoxy or solder, for example, to the CMOS chip surface 137. In this manner a high power light source may be integrated with optoelectronic and electronic functionalities of one or more high-speed optoelectronic transceivers on a single CMOS chip.

Figure 2:
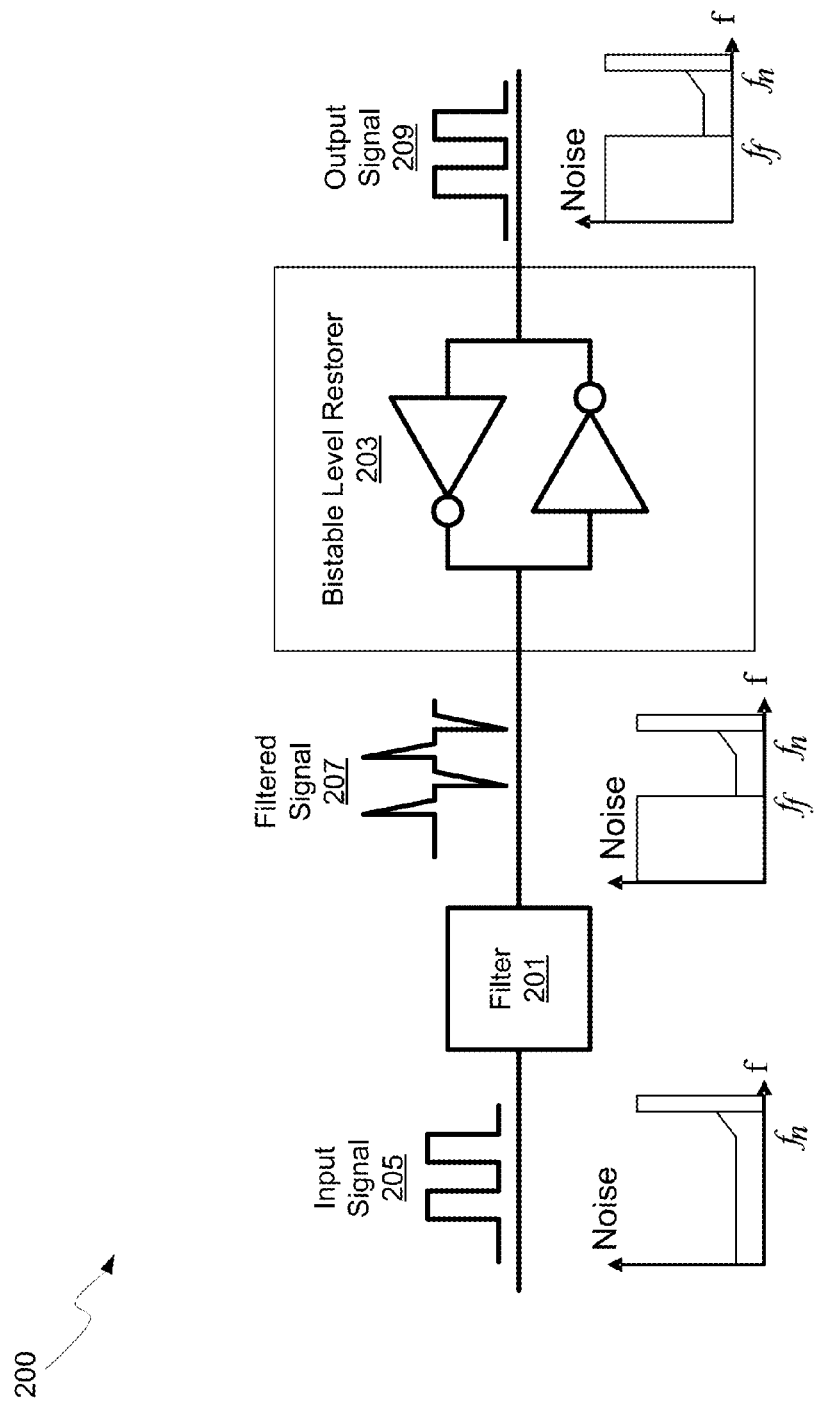
FIG. 2 is a block diagram illustrating an exemplary narrowband receiver architecture, in accordance with an embodiment of the invention.

FIG. 2 is a block diagram illustrating an exemplary narrowband receiver architecture, in accordance with an embodiment of the invention. Referring to FIG. 2, there is shown a receiver architecture 200 comprising a filter 201 and a non-return to zero (NRZ) bistable level restorer 203. There is also shown an input signal 205, a filtered signal 207, and an output signal 209.

The filter 201 comprises circuitry for filtering signals of frequencies outside of a desired frequency band. For example, the filter may allow signals above a frequency, $f_f$, and attenuate signals below $f_f$, as shown in the frequency response plot shown below the filtered signal 207.

In operation, the filter 201 may limit the bandwidth of the optical receiver in order to decrease the integrated noise, thereby increasing the signal to noise ratio. The NRZ bistable level restorer 203 may convert the resulting data pulses back into NRZ data. The NRZ bistable level restorer 203 may be implemented using a variety of embodiments including a bistable cross-coupled inverter pair, for example, which may be pulse triggered to switch between its two states.

In another embodiment of the invention, the NRZ level restorer 203 may comprise a pulse-triggered bistable circuit, a Schmitt-trigger circuit, an RS flip-flop with an inverter on theRinput, or a cross-coupled transistor pair, for example. In an embodiment of the invention, the bistable circuit may comprise an inverter with a second inverter as feedback from the output to the input, where the inverters may be single-ended or differential.

The narrowband receiver architecture 200 may provide amplification in a narrow band which includes the maximum data tone (i.e. 5 GHz for a 10 Gb/s NRZ data). This limited bandwidth may be implemented in a variety of ways including, but not limited to, the integration of a series filter, such as a high pass, band pass, and/or differentiating filter. The NRZ bistable level restorer 203 may then convert the resulting pulses back to their NRZ levels, creating an effectively 0 Hz low frequency cut-off.

Figure 3:
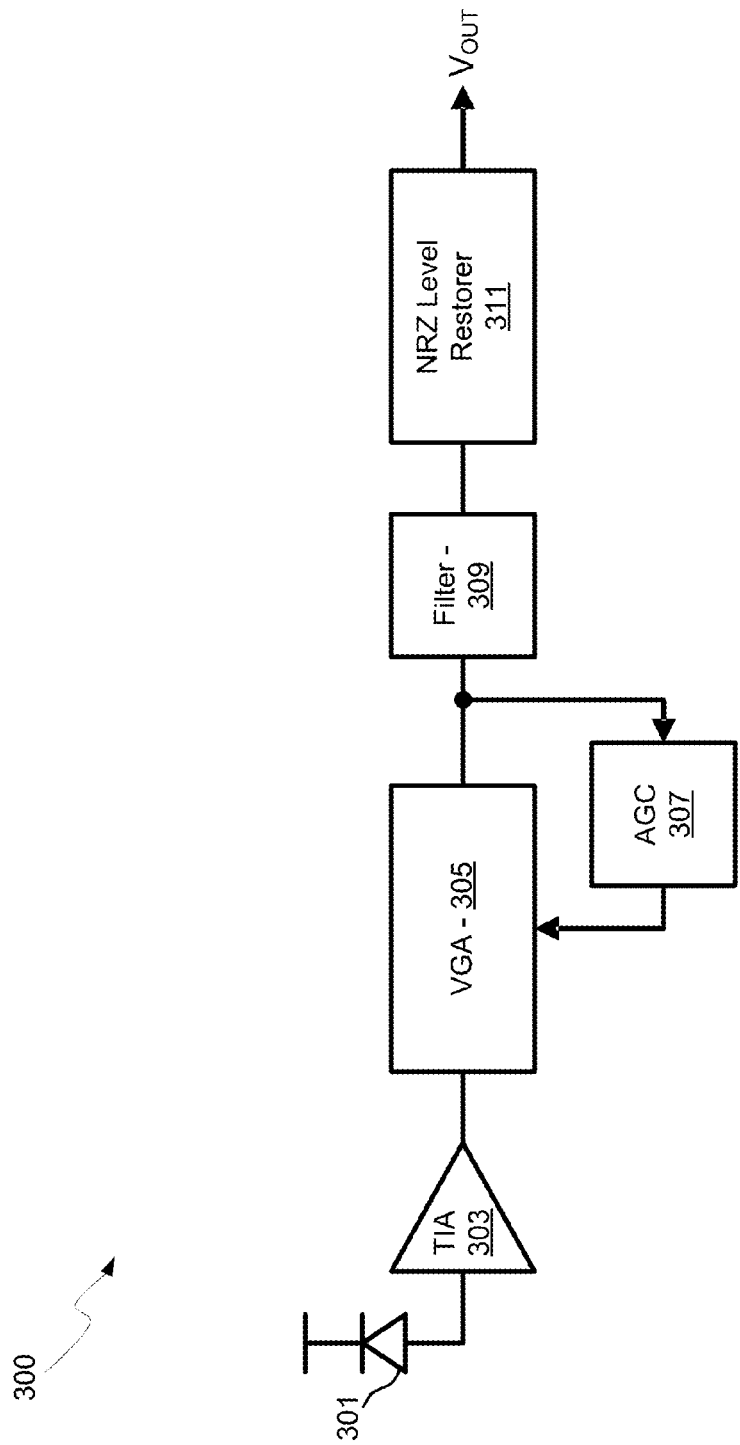
FIG. 3 is a block diagram of an exemplary narrow-band, non-linear optoelectronic receiver system, in accordance with an embodiment of the invention.

FIG. 3 is a block diagram of an exemplary narrow-band, non-linear optoelectronic receiver system, in accordance with an embodiment of the invention. Referring to FIG. 3, there is shown a receiver 300 comprising a photodetector 301, a transimpedance amplifier (TIA) 303, a variable gain amplifier (VGA) 305, an automatic gain control (AGC) block 307, a filter 309, and an NRZ level restorer 311.

The TIA 303 comprises an amplifier that is enabled to receive an input current signal and generate a voltage output signal. The photodetector 301 comprises a germanium diode, for example, and may be integrated on the same chip as the TIA 303, the VGA 305, the AGC 307, the filter 309, and the NRZ level restorer 311.

The VGA 305 comprises an amplifier that may be enabled to receive an input signal and generate an amplified output signal, where the gain level may be configured depending on the desired signal level. The VGA 305 may also receive as an input, an output signal from the AGC 307, which may enable the control of the gain level of the VGA 305. The AGC block 307 may determine the signal level at the output of the VGA 305, compare to the desired level, and generate an output signal to adjust the gain of the VGA 305 accordingly.

The filter 309 comprises a high pass filter to remove unwanted signals below a cutoff frequency, such as the cutoff frequency $f_f$, shown in FIG. 2. In this manner, the desired signal may be in the frequency range allowed to pass, while the low frequency noise signal may be filtered out. In another embodiment of the invention, the filter 309 may comprise a high-pass filter, a band-pass filter, a differentiator, or a series capacitance, for example. Additionally, the filter 309 may be placed at any point in the circuit from before the TIA 303 to after the last amplifier stage, as long as it precedes the NRZ level restorer 311.

The NRZ level restorer 311 may be substantially similar to the NRZ bistable level restorer 203, described with respect to FIG. 2, and may be enabled to receive the filtered signal from the filter 309, and generate an output signal $V_{OUT}$, with a restored waveform, as shown by the output signal 209 in FIG. 2.

In operation, an optical signal may be received by the photodetector 301 and converted into an electrical current, which may be converted to a voltage signal by the TIA 303. The resulting signal may then be amplified by the VGA 305 at a gain level configured by the AGC 307. The AGC 307 may determine the signal level at the output of the VGA 305 and adjust the gain of the VGA 305 as needed. The filter 309 may filter out low frequencies in the amplified signal with the resulting signal being communicated to the NRZ level restorer 311. The NRZ level restorer may restore the received signal to a square wave signal, resulting in the output signal $V_{OUT}$.

The limited receiver linear bandwidth decreases the integrated receiver noise, improving the signal to noise ratio and hence the sensitivity of the receiver, relative to a traditional receiver without the filtering and NRZ level restorer. The limited bandwidth also decreases susceptibility to crosstalk and power supply noise which is outside the signal bandwidth.

The non-linear NRZ level restorer allows higher low-frequency cut-offs to be used throughout the receiver, including the AGC, offset compensation and TIA. In this way, the chip area is decreased due to higher AGC and offset compensation circuit cut-off frequencies, the off-chip capacitors are not required for compensation circuits, simplifying multi-channel scaling, coding requirements are removed for external data, and it allows an AC coupled differential input to be used.

The invention is not limited to optoelectronic applications. Accordingly, in instances where the Rx 300 may be utilized for electrical communication as opposed to optical communication, the TIA 303 may be eliminated or replaced with one or more voltage domain amplifiers.

Figure 4:
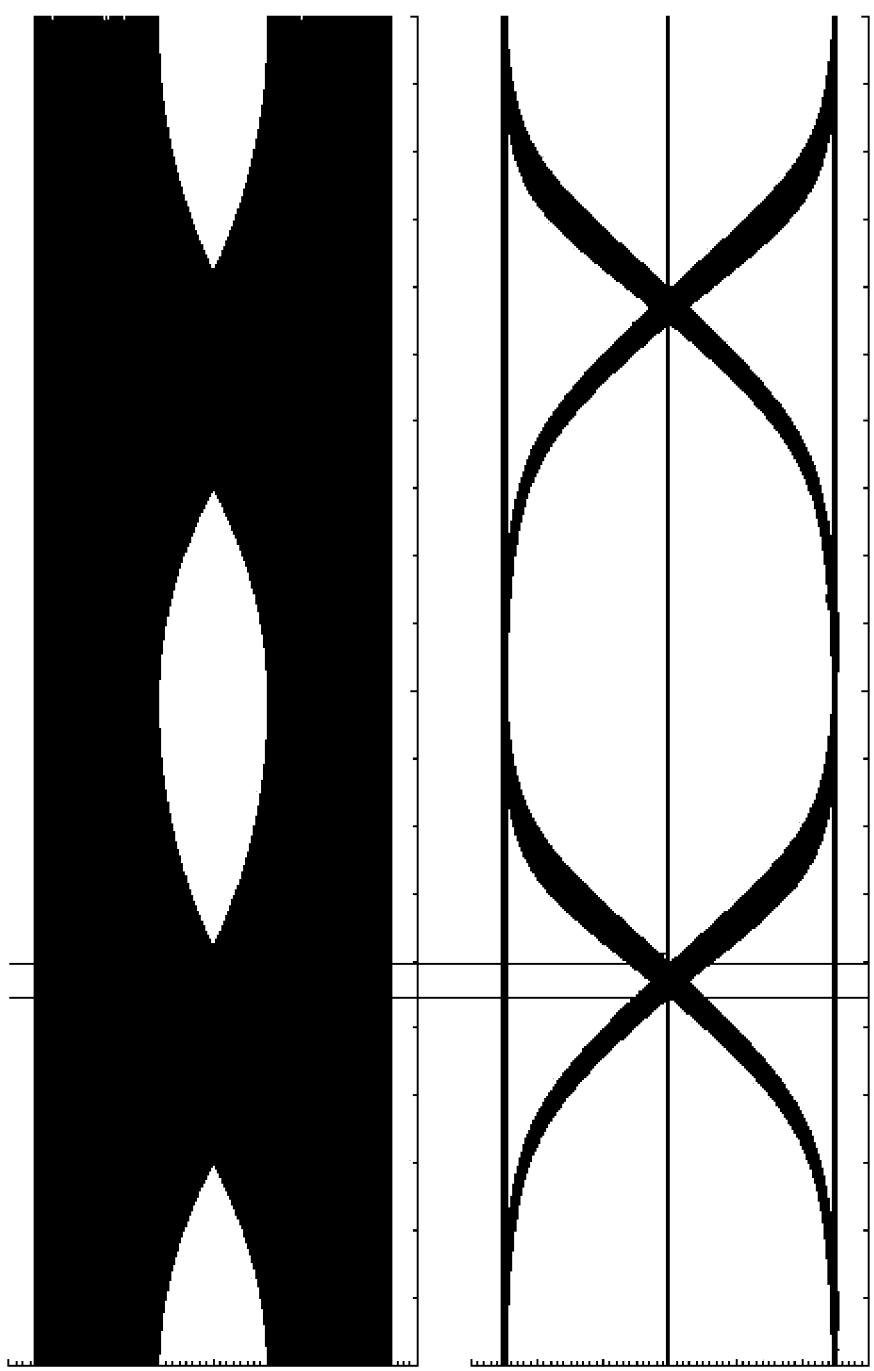
FIG. 4 is a plot of an input signal and the resulting output signal, in accordance with an embodiment of the invention.

FIG. 4 is a plot of an input signal and the resulting output signal, in accordance with an embodiment of the invention. Referring to FIG. 4, there is shown the input signal 401 comprising 10 Gbps NRZ data with an approximately 159 MHz sinusoidal interferer. The output signal 403 is the simulated output signal of the optoelectronic receiver 300, demonstrating the large reduction of noise utilizing the filter and NRZ level restorer.

Figure 5:
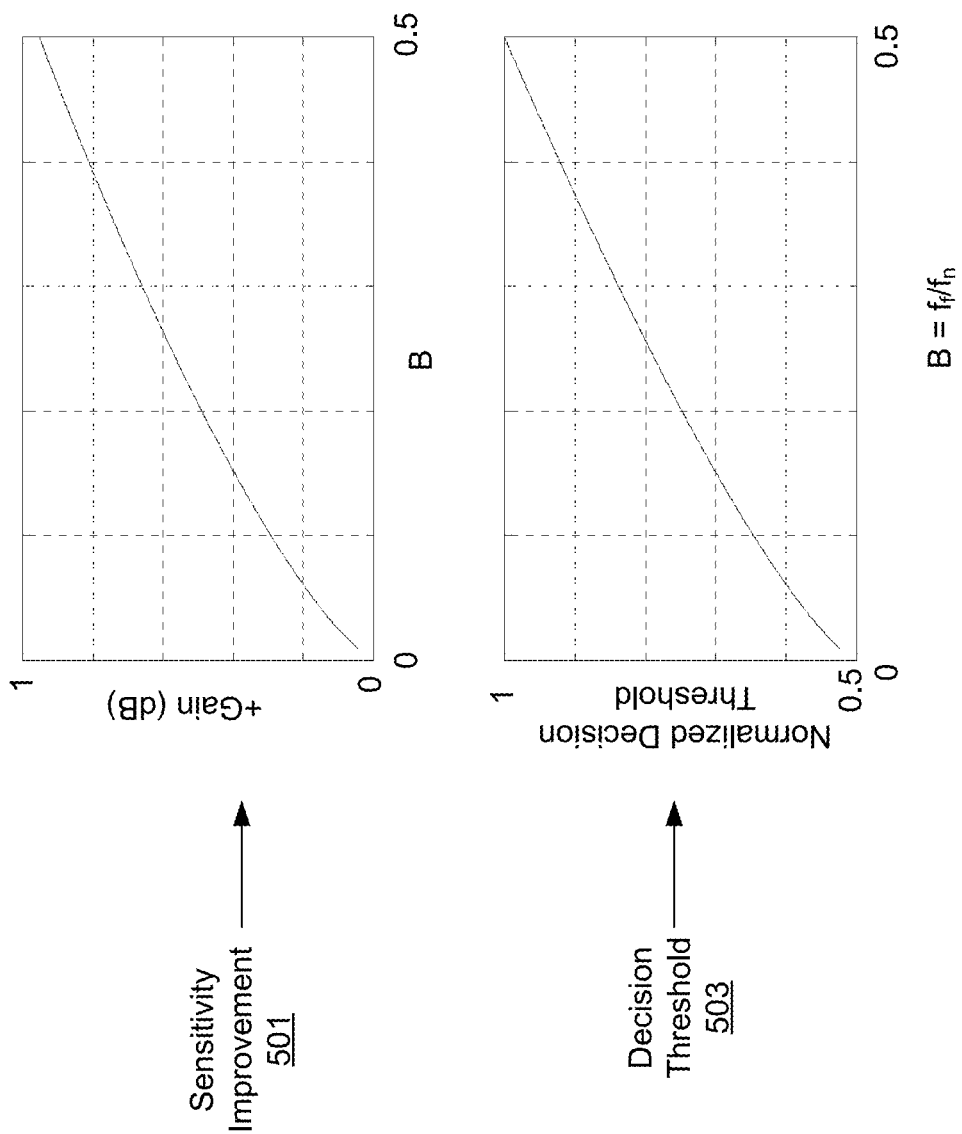
FIG. 5 is a diagram illustrating performance improvements versus filter and noise bandwidth, in accordance with an embodiment of the invention.

FIG. 5 is a diagram illustrating performance improvements versus filter and noise frequency, in accordance with an embodiment of the invention. Referring to FIG. 5, there is shown a sensitivity improvement plot 510 and a decision threshold plot 503. The x-axis for both plots is the ratio, B, of the filter frequency $f_f$ to the noise corner frequency $f_n$. The sensitivity improvement plot 501 demonstrates the improvement in sensitivity when the filter frequency approaches that of the noise frequency, narrowing the bandwidth of the allowed signal. However, as shown by the increase in the normalized decision threshold with B, the magnitude of the input signal required to switch from low to high increases as the bandwidth narrows, thus demonstrating the tradeoff involved in determining the filter cutoff frequency.

Figure 6:
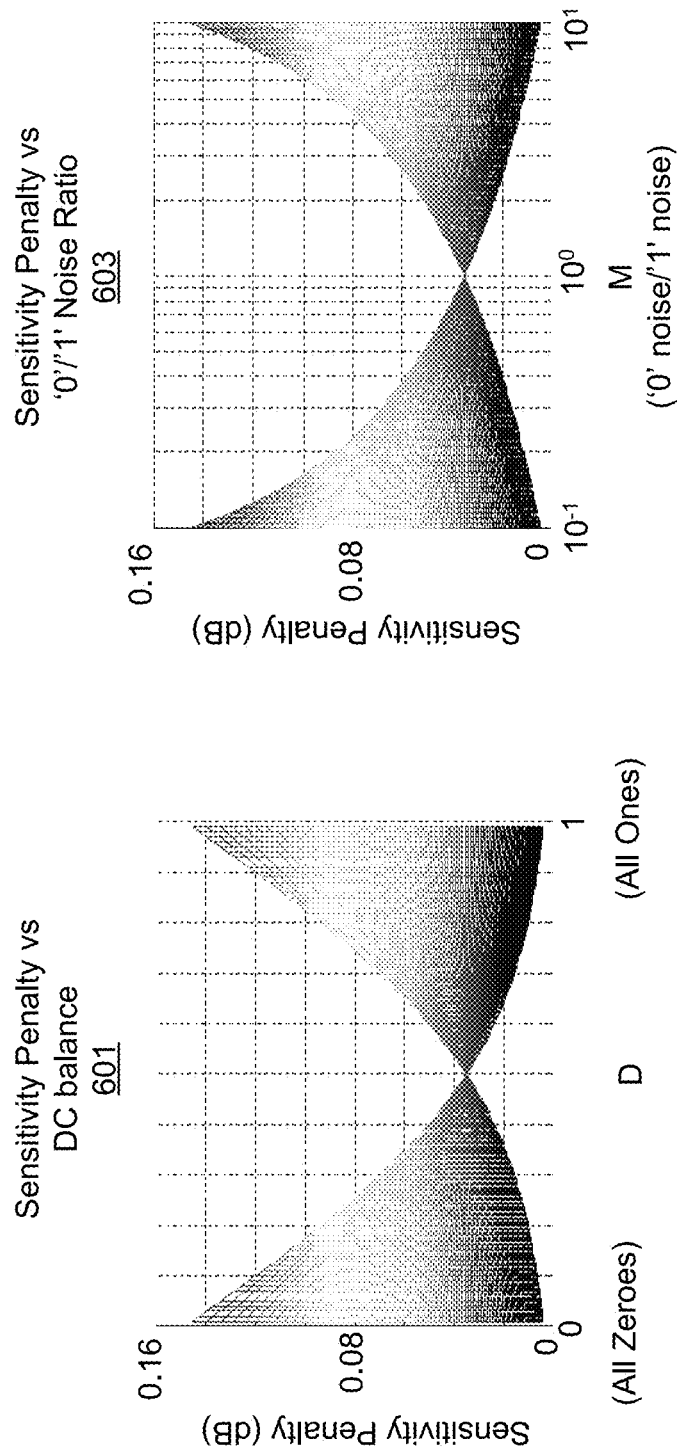
FIG. 6 is a diagram illustrating sensitivity penalty at a bit error rate (BER) of 1e-12, in accordance with an embodiment of the invention.

FIG. 6 is a diagram illustrating sensitivity penalty at a bit error rate (BER) of 1e-12, in accordance with an embodiment of the invention. Referring to FIG. 6, there is shown a sensitivity penalty versus DC balance plot 601 and a sensitivity penalty versus '0/1' noise ratio plot 603. Due to the DFE-type behavior of this circuit, a single bit flip will result in errors until another bit flip occurs. For completely random data with equal probabilities of zeros and ones and errors that are uniformly distributed in time, the increase in average BER due to error clustering is 50%, assuming run lengths from 1 to infinity are allowed. The plots in FIG. 6, show that the sensitivity penalty is less than ~0.1 dB under practical conditions.

Figure 7:
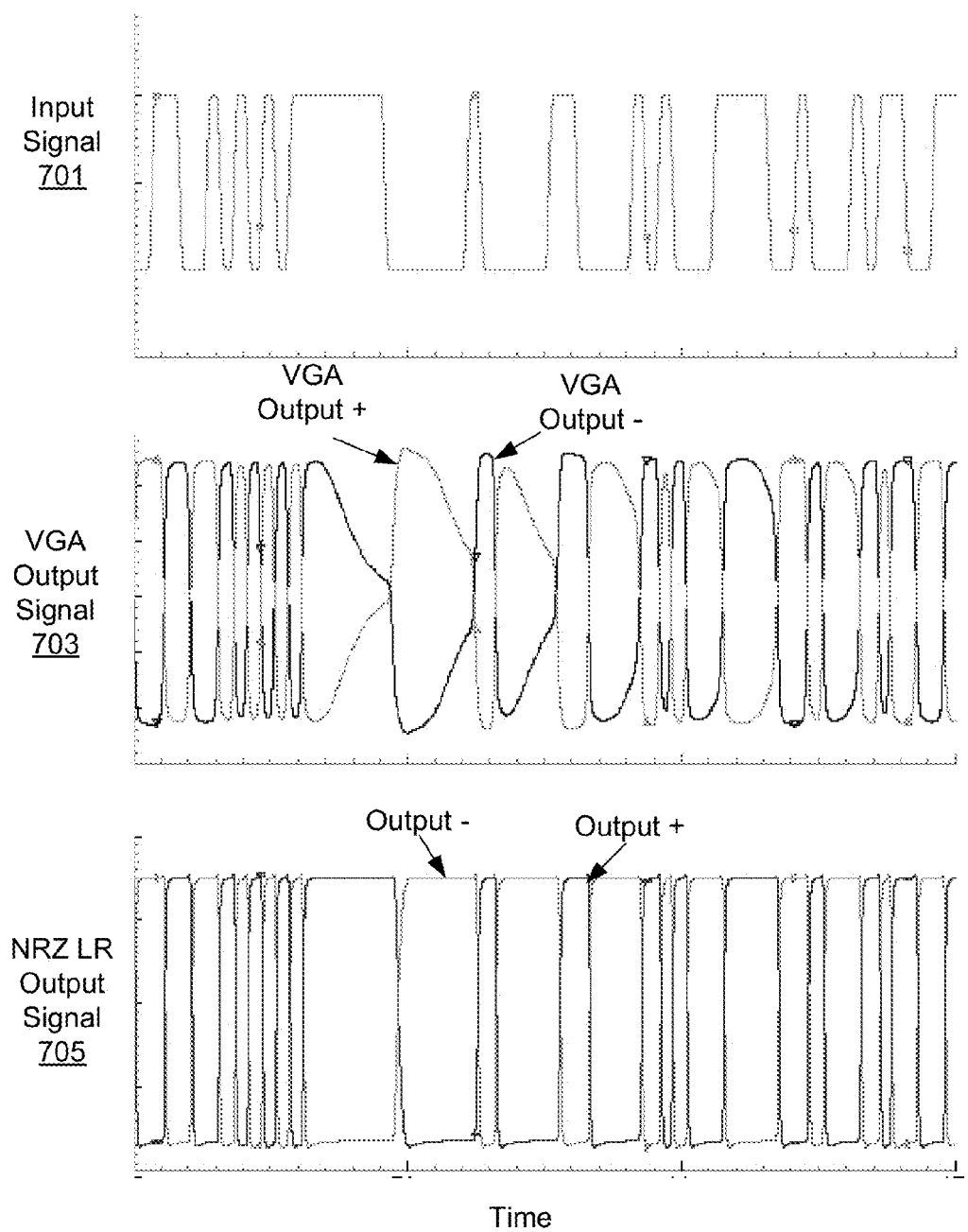
FIG. 7 is a diagram illustrating input and output signals in a narrow-band, non-linear optoelectronic receiver, in accordance with an embodiment of the invention.

FIG. 7 is a diagram illustrating input and output signals in a narrow-band, non-linear optoelectronic receiver, in accordance with an embodiment of the invention. Referring to FIG. 7, there is shown an input signal 701, a simulated VGA output signal 703, and a simulated NRZ level restorer output 705 versus time. The exemplary input signal 701 illustrates a square wave signal, and the distorted signal resulting after the VGA 305, due to non-zero low frequency cut-off, is illustrated by the VGA output signal 703. Because the circuit is effectively AC coupled to the rest of the system and its feedback maintains the last valid bit, the effective low frequency cut-off is 0 Hz. Long runs of zeros or ones will not produce any pulses and will cause the VGA output 703 to squelch, but it will not flip the state of the Circuit output until there is another pulse edge to flip the state of the circuit.

Figure 8:
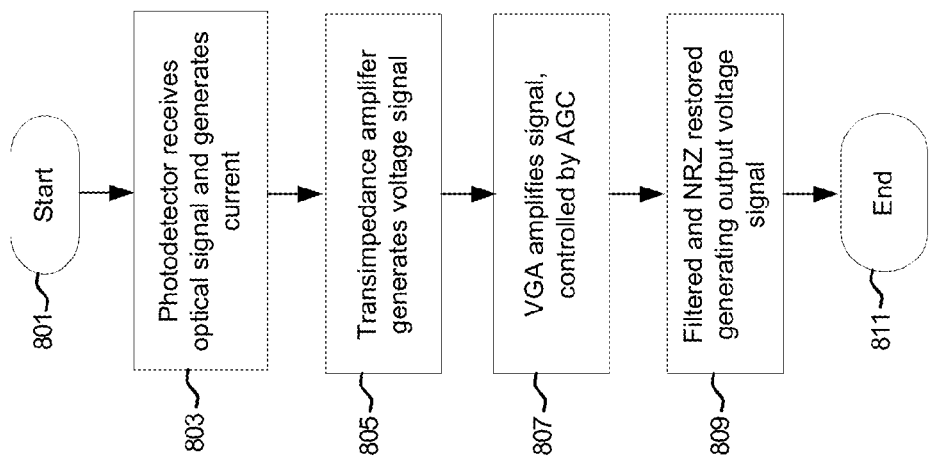
FIG. 8 is a flow diagram illustrating exemplary steps for a narrow-band, non-linear optoelectronic receiver, in accordance with an embodiment of the invention.

FIG. 8 is a flow diagram illustrating exemplary steps for a narrow-band, non-linear optoelectronic receiver, in accordance with an embodiment of the invention. Referring to FIG. 8, in step 803 after start step 801, an optical signal is received by a photodetector 301 resulting in a photogenerated current. In step 805 the TIA 303 converts the current to a voltage signal that is amplified in step 807 by the VGA 305 with the gain level controlled by the AGC 307. In step 809, the amplified signal is filtered by the filter 309 and then restored by the NRZ level restorer 311, followed by end step 811.

In an embodiment of the invention, a method and system are disclosed for amplifying a received signal, limiting a bandwidth of the received signal, and restoring the amplified, bandwidth-limited received signal utilizing a level restorer 203/311. The level restorer may comprise a non-return to zero (NRZ) level restorer 203/311. The NRZ level restorer 203 may comprise a pulse-triggered bistable circuit. The pulse-triggered bistable circuit 203 may comprise two parallel inverters, and wherein a first of the inverters comprises a feedback path for a second of the inverters, which may comprise single-ended or differential inverters. A photogenerated signal may be amplified in the receiver 300 utilizing a transimpedance amplifier 303 and one or more variable gain amplifiers (VGAs) 305. A received electrical signal may be amplified via one or more VGAs 305. The bandwidth of the received signal may be limited utilizing one or more of: a low pass filter, a bandpass filter, a high pass filter 201, a differentiator, or a series capacitance on the chip. The signal may be received from a photodiode 301 integrated on the chip 130.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing signals, the method comprising:
   in a receiver on a chip,
       amplifying a received signal that is generated from a received optical signal utilizing a transimpedance amplifier and one or more variable gain amplifiers (VGAs);
       limiting a bandwidth of said received signal utilizing a band pass filter; and
       restoring said received signal utilizing a non-return to zero (NRZ) level restorer comprising a pulse-triggered bistable circuit, wherein said pulse-triggered bistable circuit comprises two parallel inverters, and wherein a first of said inverters comprises a feedback path for a second of said inverters.

2. The method according to claim 1, comprising limiting the bandwidth to be centered around a frequency of 5 GHz.

3. The method according to claim 1, wherein said chip comprises a complementary metal-oxide semiconductor (CMOS) chip.

4. The method according to claim 1, wherein said inverters comprise single-ended inverters.

5. The method according to claim 1, wherein said inverters comprise differential inverters.

6. The method according to claim 1, comprising amplifying a received electrical signal via one or more VGAs.

7. The method according to claim 1, comprising limiting said bandwidth of said received signal utilizing one or more of: a differentiator or a series capacitance on said chip.

8. The method according to claim 1, comprising receiving said signal from a photodiode integrated on said chip.

9. The method according to claim 8, wherein said photodiode is AC coupled to an amplifier for said amplifying.

10. A system for processing signals, the system comprising:
    in a receiver on a chip, one or more circuits operable to amplify a received signal that is generated from a received optical signal utilizing a transimpedance amplifier and one or more variable gain amplifiers (VGAs);
    said one or more circuits comprise a band pass filter; and
    said one or more circuits restore said received signal utilizing a Non-return to Zero (NRZ) level restorer comprising a pulse-triggered bistable circuit, wherein said pulse-triggered bistable circuit comprises two parallel inverters, and wherein a first of said inverters comprises a feedback path for a second of said inverters.

11. The system according to claim 10, wherein said one or more circuits are operable to limit the bandwidth to be centered around a frequency of 5 GHz.

12. The system according to claim 10, wherein said chip comprises a complementary metal-oxide semiconductor (CMOS) chip.

13. The system according to claim 10, wherein said inverters comprise single-ended inverters.

14. The system according to claim 10, wherein said inverters comprise differential inverters.

15. The system according to claim 10, wherein said one or more circuits are enabled to amplify a received electrical signal via one or more VGAs.

16. The system according to claim 10, wherein said one or more circuits are enabled to limit said bandwidth of said received signal utilizing one or more of: a differentiator or a series capacitance on said chip.

17. The system according to claim 10, wherein said one or more circuits are enabled to receive said signal from a photodiode integrated on said chip.

18. A system for processing signals, the system comprising:
    in a receiver on a chip, one or more circuits that are operable to:
        generate an electrical signal from a received optical signal;
        AC couple the electrical signal to an amplifier;
        amplify the AC coupled electrical signal utilizing a transimpedance amplifier and one or more variable gain amplifiers (VGAs);
        limit a bandwidth of the amplified signals; and
        restore said received signal utilizing a Non-return to Zero (NRZ) level restorer comprising a pulse-triggered bistable circuit, wherein said pulse-triggered bistable circuit comprises two parallel inverters, and wherein a first of said inverters comprises a feedback path for a second of said inverters.

* * * * *